April 7, 1970  L. W. EIDEN ET AL  3,504,640
CONTINUOUS FOOD SHAPING APPARATUS

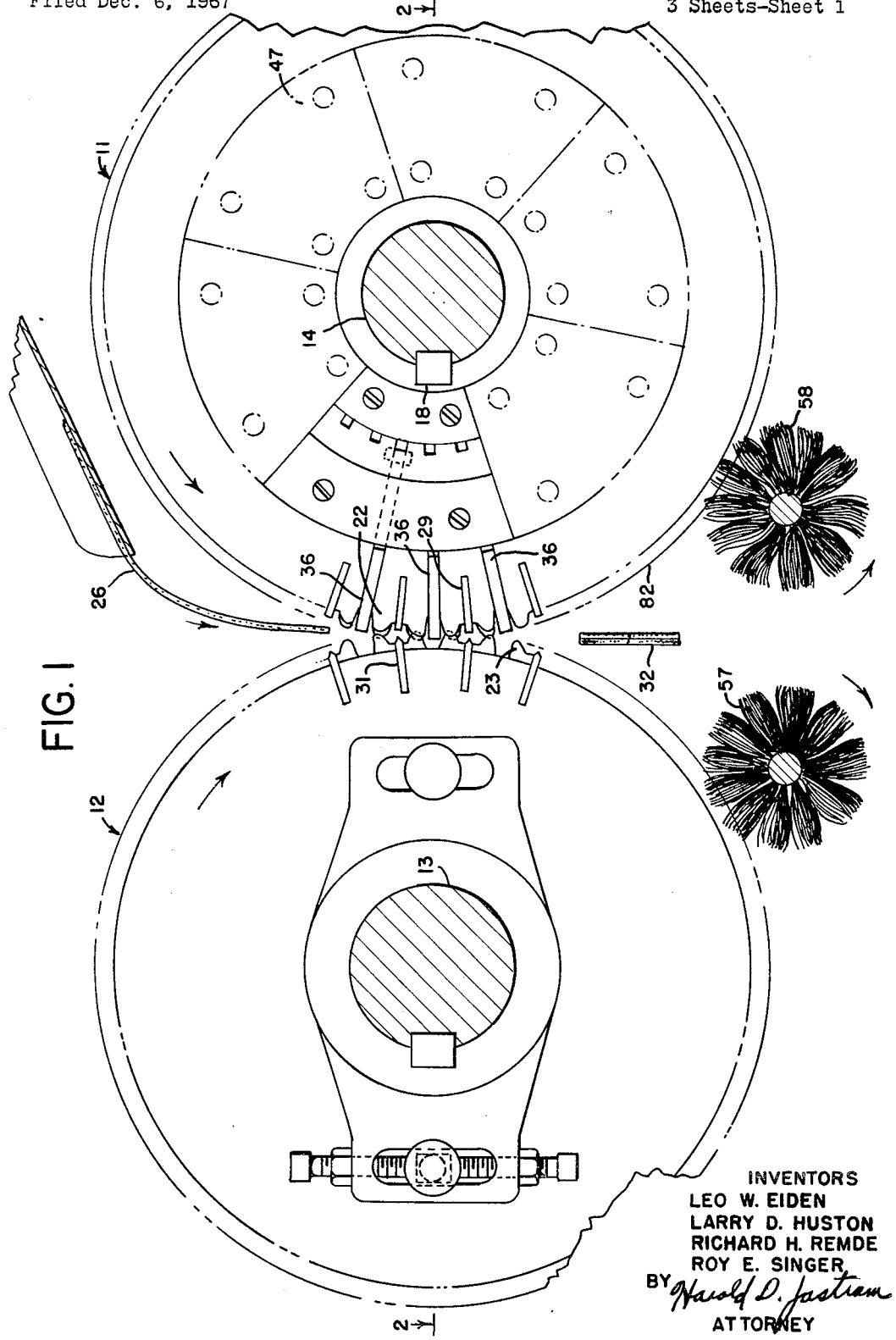

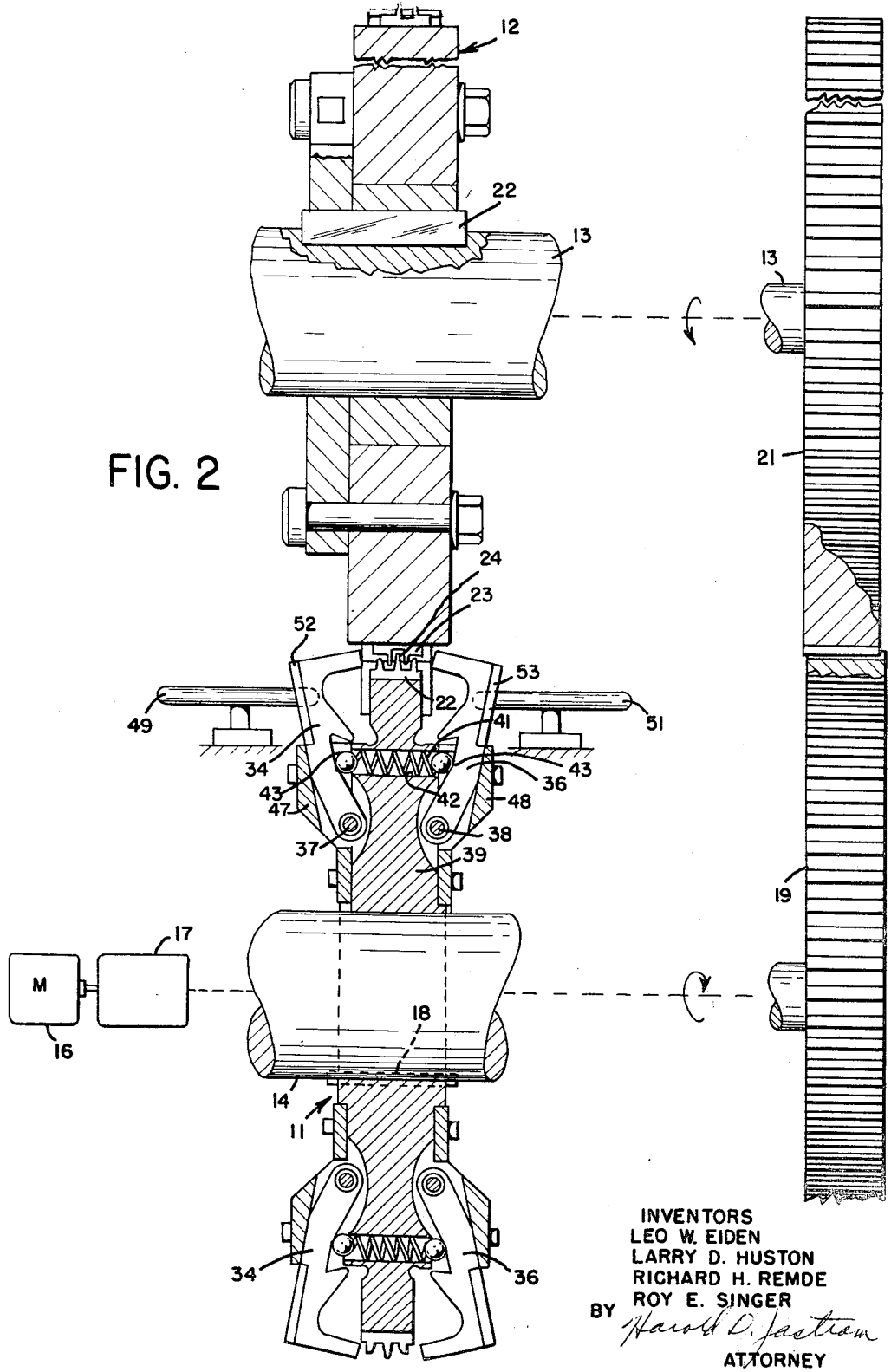

Filed Dec. 6, 1967  3 Sheets-Sheet 3

INVENTORS
LEO W. EIDEN
LARRY D. HUSTON
RICHARD H. REMDE
ROY E. SINGER

BY *Harold D. Jastrem*

ATTORNEY

United States Patent Office 3,504,640
Patented Apr. 7, 1970

3,504,640
CONTINUOUS FOOD SHAPING APPARATUS
Leo W. Eiden, Minneapolis, Larry D. Huston, Buffalo, and Richard H. Remde and Roy E. Singer, Minneapolis, Minn., assignors to General Mills, Inc., a corporation of Delaware
Filed Dec. 6, 1967, Ser. No. 688,517
Int. Cl. A21c 11/04
U.S. Cl. 107—69         3 Claims

ABSTRACT OF THE DISCLOSURE

An apparatus for shaping food product from a moving sheet of cereal dough. A pair of rotary shapers having matching dies and cutters cooperate to simultaneously shape and sever the dough sheet as the dough passes between the rotating shapers, a pair of fingers is associated with matching dies to place a crimp in a sheet of cereal dough as the sheet is shaped and severed by the rotating shapers.

---

This invention relates to an apparatus for shaping food products and more particularly relates to a continuous cutter shaper for producing a unique shaped dough product from a continuously moving sheet of cereal dough passing between rotary cutters.

The food industry has, for many years, attempted to produce finished food products which are not only nutritious but which are also attractive to the eye of the consumer. This has become an increasingly important consideration in the food industry in view of the great variety of food products made available to the consumer and by the increased interest in snack food products.

The modern consumer demands more than merely a nutritious food product. He demands something which is eye appealing and which therefore catches his eye as he is shopping for foods at a supermarket. Additionally, he demands an attractive product which will whet his appetite. These demands of the modern day consumer are especially noted in the highly processed food characterized as snacks. Snacks, in general, are foods which the consumer tends to purchase for his personal enjoyment and not merely for their nutritional value. For this reason, the consumer seems to demand eye appeal in addition to nutrition to warrant his purchase of such product. Because of these characteristics of snack food products, food processors continually endeavor to develop shapes which are eye appealing but which are also marketable. The products must be marketable in the sense that the product must be handled by the producer to package, store and ship the products without damage to the shape. This multitude of requirements which the food producer must meet are additionally complicated by production techniques. In order for a producer to sell snack foods at reasonable and attractive prices which the consumer will be willing to pay, the producer must also manufacture the unusual and attractive product at a reasonable cost. This demands processing which eliminates waste, recycling of product, and a process which will produce product on a sufficiently high volume to reduce production costs.

With the above problems in view, it is therefore an object of the present invention to provide an apparatus whereby food product may be shaped into attractive configuration economically and at high volume.

An object of the present invention is to provide a new and improved apparatus which utilizes rotary shapers to sever and shape pieces of dough from a moving sheet of dough in order to produce an attractive product on a continuous basis with little or no waste.

An apparatus in accordance with the present invention involves a pair of rotary members or shapers which have matching dies mounted at spaced intervals about the periphery of each rotary member. The dies on each of the rotary members are separated by a cutting blade which match a similar cutting blade on the adjacent rotary shaper. The respective shapers are rotated in timed relationship so that the dies on the periphery of the respective rotary shapers and the respective cutters cooperate to simultaneously and continuously shape pieces of dough from a sheet of dough passing between the shapers and also sever the dough sheet into predetermined lengths regardless of the diameter of the cooperating shapers.

A more complete understanding of the invention can be achieved by reference to the drawings in which:

FIGURE 1 is a front view illustrating adjacent rotary shapers for producing shaped pieces of dough food product;

FIGURE 2 is a partial cross sectional view taken along line 2—2 of FIGURE 1 illustrating the cooperation between the rotary shapers disclosed in FIGURE 1 of the drawings;

Figure 4:
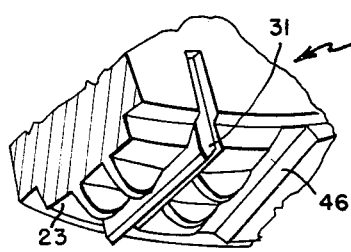
FIGURE 4 is a fractional isometric view of the cooperating rotary shaper which cooperates with the shaper illustrated in FIGURE 3 of the drawings.

Refer first to FIGURE 1 of the drawings which illustrates the apparatus consisting essentially of two adjacent rotary shapers generally designated by the numerals 11 and 12. These rotary shapers 11 and 12 are mounted on shafts 13 and 14 respectively and which are driven by a gear and motor system. This gear and motor system is illustarted in FIGURE 2 of the drawings where the motor 16 is connected through a gear box 17 to the drive shaft 14 of rotary cutter 11. Drive shaft 14 is rigidly connected to the rotary shaper 11 by a pin 18. The other end of drive shaft 14 is connected to a spur gear 19 which in turn meshes with a spur gear 21. Spur gear 21 is connected to shaft 13 which is in turn rigidly connected by pin 22 to rotary cutter 12 to operate the cutter 12 in a timed relationship with the rotary shaper 11. Shapers 11 and 12 may be of equal or different diameter. Thus it will be observed that by regulating the size of the gears 19 and 21, the linear velocity of the periphery of the respective shapers tangent to the periphery of each of the shapers at the point where they cooperate with each other (see FIGURE 1 of the drawings) can be regulated to be exactly equal. If the rotary shapers 11 and 12 are of exactly the same diameter as illustrated for the purposes of explaining the invention, then the gears 19 and 21 will be of the same diameter in order to insure that the linear velocity of each of the shapers 11 and 12 is the same.

Figure 6:
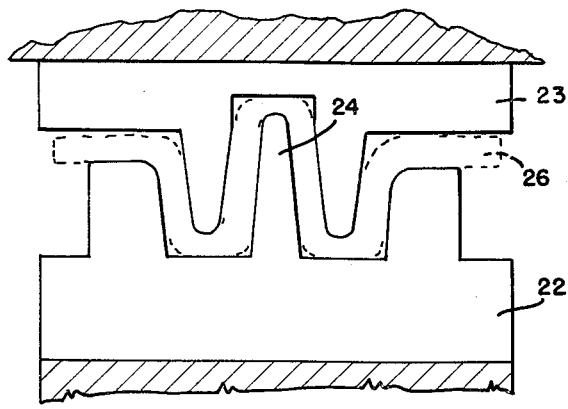

Each of the rotary shapers 11 and 12 has dies 22 and 23 respectively mounted at spaced intervals about the periphery of the respective shapers 11 and 12. The dies 22 and 23 are mounted on the respective shapers 11 and 12 so that the dies cooperate with each other as the shapers 11 and 12 are rotated. The respective dies 22 and 23 cooperate as illustrated in FIGURES 2 and 6 of the drawings so that shaping surfaces 24 on each of the dies mesh to thereby fold or crimp a sheet of cereal dough 26 which is passing between the rotary shapers 11 and 12 as illustrated in FIGURES 1 and 6 of the drawings.

Each of the dies 22 mounted at predetermined spaced intervals about the periphery 28 of rotary shaper 11 has a cutting blade 29 radially mounted between each of the dies 22. Each of these cutting blades 29 are mounted so that they lie along the radius of the rotary shaper 11 and cooperate with a similar cutter 31 which is similarly mounted in rotary shaper 12. As the shapers 11 and 12 rotate, the respective cooperating cutters 29 and 31 sever the dough sheet 26 into pieces of predetermined length determined by the distance between adjacent cutters 29 of the rotary shaper 11. It will be observed then that as the dough sheet 26 passes between the rotary shapers 11 and 12, the respective dies 22 and 23 crimp the dough sheet along the length of the sheet and the cutters 29 and 31 sever the crimped piece of dough as they cooperate to simultaneously cut the dough sheet as the sheet is being crimped. Further rotation of the respective rotary shapers in the arrow direction illustrated in FIGURE 1 of the drawing will release the severed and shaped dough piece 32 which is released for further processing. The dies 22 may be of equal or varying predetermined length, however, if dies 22 are of varying predetermined length, they must be matched by cooperating dies 23 on shaper 12.

Figure 5:
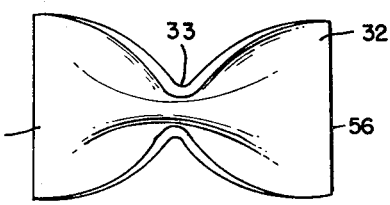
FIGURE 5 is an illustration of a product made by the apparatus and, FIGURE 6 is a fractional cross section of dies on the rotary shapers illustrated in FIGURE 1.

The cooperating dies 22 and 23 merely crease the sheet of dough 26 along the length thereof. In order to produce a snack shaped as illustrated in FIGURE 5 of the drawings, with a constricted central portion 33, an additional apparatus is attached to the rotary shaper 11. Refer now to FIGURE 2 of the drawings which illustrate crimping fingers 34 and 36, respectively, which are pivotally connected at pivot points 37 and 38, respectively. These pivot points are merely pins connected to the body portion 39 of the rotary shaper 11. As illustrated in FIGURE 1 of the drawings, there is an individual pair of crimping fingers 34 and 36 cooperating with each of the individual dies 22 and 23 of the rotary shapers.

Figure 3:
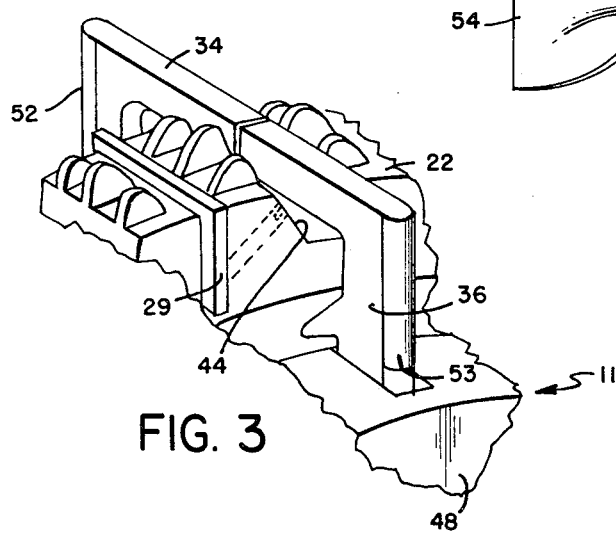
FIGURE 3 is a fractional isometric view of a first shaper illustarted in FIGURE 2 of the drawings.

The fingers 34 and 36 are forced apart by a spring 41 which is mounted in a hole 42 drilled through the body portion 39 of the rotary shaper 11. Bearings 43 contact the individual fingers 34 and 36 under the force of the compression spring 41 to force the individual fingers 34 and 36 away from each other and forcing the fingers 34 and 36 out of channels 44 and 46 of the dies 22 and 23 respectively. When the fingers 34 and 36 are in the position illustrated in FIGURE 2 of the drawing, they are in the inoperative position. The individual fingers 34 and 36 are restrained from moving too far apart by plates 47 and 48 respectively. As the rotary shapers 11 and 12 rotate, the fingers are brought into engagement with a pair of cams 49 and 51 respectively which engage caming surfaces 52 and 53 on respective crimping fingers. The cams 49 and 51 overcome the tension of the compression spring 41 and force the crimping fingers 34 and 36 towards each other into channels 44 and 46 of the engaging dies 22 and 23 as the dies are placing the longitudinal folds or crimps in the sheet of dough 26. The cams 49 and 51 are located with respect to the rotary shapers 11 and 12 so that the crimping fingers 34 and 36 are forced closer together (see FIG. 3) at about the time that a piece of crimped dough is severed from the dough sheet 26. The crimping fingers 34 and 36 further pinch the sheet of dough 26 perpendicular to the longitudinal axes of the sheet 26 to form a compressed or pinched portion 33 in the dough piece 32. This forms a piece of dough 32 which is illustrated in FIGURE 5 of the drawings having a central portion 33 which is severly pinched and which has ends 54 and 56 which are fan shaped.

Due to the somewhat plastic characteristics of many cereal dough products which might be used for producing snacks, the shaped piece 32 frequently will become stuck in one of the dies 22 or 23. If this piece is permitted to continue around the surface of the rotary shapers 11 or 12 until the shapers reengage, this piece of material will cause production of unsatisfactory product. Therefore, brushes 57 and 58 are mounted adjacent to the periphery of the respective rotary shapers 11 and 12. These brushes are rotated the same direction of rotation of the respective shapers 11 and 12 as illustrated in FIGURE 1 to remove pieces of shaped dough which may become stuck to the face of the respective dies 22 and 23. This will insure removal of the severed pieces 32 from the rotary shapers and will also insure uniform and quality production of shaped food products.

It is to be understood that the above illustration of an apparatus is merely illustrative of the principles of the invention and may variations may occur to those skilled in the art which fall within the spirit and scope of the present invention. For example, the adjacent cutters 29 and 31 may either have flat edges as shown on cutters 29 or the adjacent cutters may be sharpened as illustrated with cutter 31. Pairs of flat surfaced cutters or pairs of sharpened cutters may be utilized rather than the alternate sharp and flat surfaces illustrated in this invention without departing from the spirit and scope hereof.

Now, therefore, we claim:

1. An apparatus for shaping pieces of food product from a sheet of dough which comprises first and second engaged rotary shapers, cutting blades radially mounted at predetermined distances about the periphery of said first shaper, cutting blades radially mounted about the periphery of said first shaper, cutting blades radially mounted about the periphery of said second shaper to engage the cutting blades of said first shaper, a die mounted between each of the cutting blades on the periphery of said first shaper, a die mounted between each of the cutting blades on the periphery of said second shaper, the individual dies mounted between engaging cuttnig blades of said first and second shapers cooperating to crimp a sheet of dough passing between the first and second shapers, means for driving said shapers to continuously shape and cut pieces of dough, pairs of crimping fingers mounted on said first shaper, an individual pair of said fingers mounted on said first shaper to cooperate with a single die on the periphery of said first shaper, a first finger of each of said pairs of fingers being pivotally mounted on a first side of said first shaper and a second finger of each of said pairs being pivotally mounted opposite said first finger on a second side of said first shaper, means mounted on said first shaper for separating the first and second fingers of each of said pairs of fingers, and cam means for moving the first and second fingers of each pair of fingers together when the dies of the first and second shapers are brought into engagement as the first and second shapers are rotated to pinch a selected portion of the dough sheet as the sheet passes between said cooperating dies.

2. An apparatus in accordance with claim 1 in which all of the dies are of equal length and in which said means for separating is a compression spring.

3. An apparatus in accordance with claim 1 in which each of said dies on said first shaper has two sets of shaping surfaces separated by a channel which permits free movement of a pair of associated crimping fingers between said two sets of surfaces of an individual die, said cam means forcing the individual fingers of a pair toward each other in said channel and said spring means moving said individual fingers out of said channel when said cam means disengage the fingers.

References Cited

UNITED STATES PATENTS

| | | | |
|---|---|---|---|
| 1,252,822 | 1/1918 | Lorioli | 107—69 |
| 2,714,861 | 8/1955 | Castronuovo | 107—69 |

WALTER A. SCHEEL, Primary Examiner

ROBERT I. SMITH, Assistant Examiner